(12) United States Patent
Sugiyama et al.

(10) Patent No.: US 11,798,133 B2
(45) Date of Patent: Oct. 24, 2023

(54) IMAGE PROCESSING APPARATUS

(71) Applicant: FUJIFILM BUSINESS INNOVATION CORP., Tokyo (JP)

(72) Inventors: Fumiaki Sugiyama, Kanagawa (JP); Junichi Uchiyama, Kanagawa (JP); Tsutomu Nagaoka, Kanagawa (JP); Susumu Kimura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 647 days.

(21) Appl. No.: 16/851,671

(22) Filed: Apr. 17, 2020

(65) Prior Publication Data
US 2021/0192691 A1    Jun. 24, 2021

(30) Foreign Application Priority Data

Dec. 18, 2019   (JP) .................................. 2019-228366

(51) Int. Cl.
*G06K 9/00* (2022.01)
*G06T 5/00* (2006.01)
*G06T 7/11* (2017.01)

(52) U.S. Cl.
CPC .................. *G06T 5/00* (2013.01); *G06T 7/11* (2017.01); *G06T 2200/08* (2013.01)

(58) Field of Classification Search
CPC ......... G06T 5/00; G06T 7/11; G06T 2200/08; G06T 1/20
See application file for complete search history.

(56) References Cited

U.S. PATENT DOCUMENTS 8,760,721 B2 * 6/2014 Hara .................. G06K 15/1851
                                                    712/15
9,013,506 B2    4/2015 Tamatani et al.
(Continued)

FOREIGN PATENT DOCUMENTS

JP    2012234337 A  * 11/2012    ......... G06F 15/7875
JP    5699778 B2      4/2015
(Continued)

OTHER PUBLICATIONS

Implementation and Evaluation of Image Processing Algorithms on Reconfigurable Architecture using C-based Hardware Descriptive Languages, Daggu Venkateshwar Rao etal, IJTACS, 2006, pp. 9-34 (Year: 2006).*
Dynamically Reconfigurable Vision with High Performance CMOS Active Pixel Sensors (APS),Bedabrata Pain et al., IEEE, 2002, pp. 21-26 (Year: 2002).*

*Primary Examiner* — Jayesh A Patel
(74) *Attorney, Agent, or Firm* — Oliff PLC

(57) ABSTRACT

An image processing apparatus includes a processor that performs image processing and that is constructed by using a reconfigurable-circuit device whose circuit is reconfigurable. The processor is configured to acquire image data that corresponds to each of one or more small regions into which an image is divided, determine a feature of the image data that is acquired and that corresponds to each of the one or more small regions, select a circuit configuration and perform processing in accordance with the obtained feature of the image data that corresponds to each of the one or more small regions, and cause a repository to retain rendering information, which is the image data that corresponds to each of the one or more small regions and that has undergone the processing.

11 Claims, 6 Drawing Sheets

(56) References Cited

U.S. PATENT DOCUMENTS

| | | | | |
|---|---|---|---|---|
| 2006/0098229 | A1* | 5/2006 | Matsunaga | G06T 1/20 358/1.9 |
| 2011/0235078 | A1* | 9/2011 | Hara | G06F 3/1211 358/1.13 |
| 2012/0269452 | A1* | 10/2012 | Naito | G06T 1/20 382/244 |
| 2014/0071463 | A1* | 3/2014 | Achiwa | G06K 15/1856 358/1.5 |
| 2015/0195553 | A1* | 7/2015 | Tamatani | H04N 19/44 382/233 |
| 2015/0229804 | A1* | 8/2015 | Shinto | H04L 67/34 358/1.16 |
| 2015/0256687 | A1* | 9/2015 | Shinto | G06F 3/1229 358/1.15 |
| 2015/0261478 | A1* | 9/2015 | Obayashi | H04N 1/00896 358/1.15 |
| 2016/0036998 | A1* | 2/2016 | Goda | H04N 1/00509 358/1.13 |
| 2016/0057305 | A1* | 2/2016 | Suzuki | H04N 1/00912 358/1.13 |

FOREIGN PATENT DOCUMENTS

| | | | | |
|---|---|---|---|---|
| JP | 2015198405 A | * | 11/2015 | |
| JP | 6160317 B2 | | 7/2017 | |
| JP | 6323209 B2 | | 5/2018 | |
| JP | 6478525 B2 | * | 3/2019 | G06T 1/20 |
| WO | WO-2015156236 A1 | * | 10/2015 | B41J 29/38 |

* cited by examiner

FIG. 5

| | MAIN SCAN WIDTH | MAIN SCAN WIDTH /2 | MAIN SCAN WIDTH /4 | MAIN SCAN WIDTH /8 | MAIN SCAN WIDTH /16 | MAIN SCAN WIDTH /32 | MAIN SCAN WIDTH /64 | 4 | 2 | 1 |
|---|---|---|---|---|---|---|---|---|---|---|
| AVERAGE RUN LENGTH | 1 | 2 | 4 | 8 | 16 | 32 | 64 | 4 | 2 | 1 |
| FILL NUMBER | 14080 | 7040 | 3520 | 1760 | 880 | 440 | 220 | 3520 | 7040 | 14080 |
| sFILL NUMBER | 14080 | 7040 | 3520 | 1760 | 1760 | 1320 | 1100 | 939 | 939 | 939 |
| FILL PROCESSING | 56324 | 28164 | 14084 | 7044 | 3524 | 1764 | 884 | 20 | 12 | 8 |
| sFILL PROCESSING | 28168 | 14088 | 7048 | 3528 | 3528 | 2648 | 2208 | 1886 | 1886 | 1886 |
| DTCOPY PROCESSING | 21132 | 21132 | 21132 | 21132 | 21132 | 21132 | 21132 | 21132 | 21132 | 21132 |

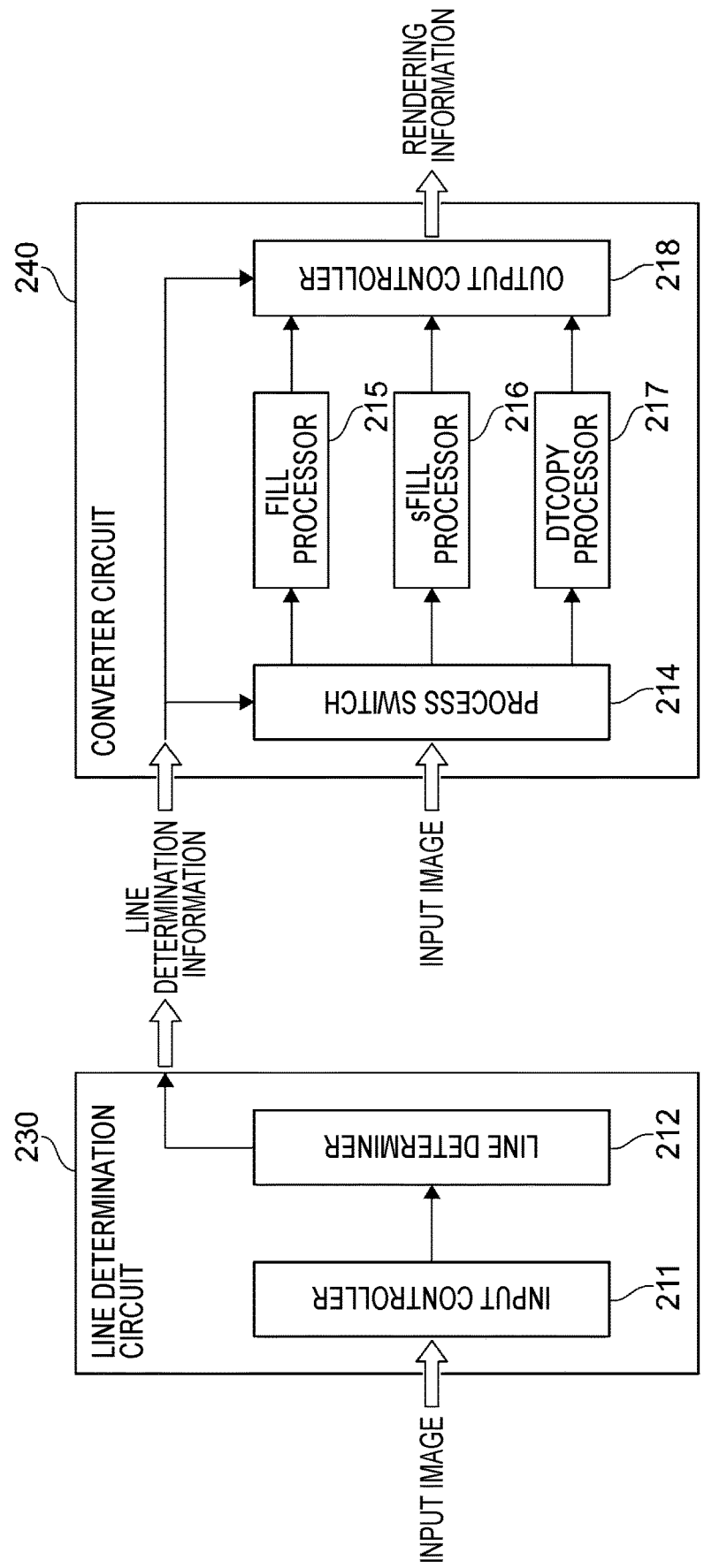

IMAGE PROCESSING APPARATUS

CROSS-REFERENCE TO RELATED APPLICATIONS

This application is based on and claims priority under 35 USC 119 from Japanese Patent Application No. 2019-228366 filed Dec. 18, 2019.

BACKGROUND (i) Technical Field

The present disclosure relates to an image processing apparatus.

(ii) Related Art

Reconfigurable-circuit devices, such as a dynamic reconfigurable processor (DRP) and a field-programmable gate array (FPGA), are used to construct an image processing unit in an image processing apparatus.

Japanese Patent No. 6160317 discloses an image processing apparatus including a reconfigurable circuit, a rendering unit, and a command generation unit. The reconfigurable circuit has a circuit construction that can be reconfigured. The rendering unit is constructed as a circuit in the reconfigurable circuit, accesses an image memory, and renders on the image memory an object represented by image data. The command generation unit interprets the image data and generates a command to instruct the rendering unit to render different objects in succession on the image memory.

When functional implementation that exceeds the current finite circuit scale is attempted in a reconfigurable-circuit device, such as DRP or FPGA, the device has been replaced by a device having a circuit scale that meets the functional implementation that is required. Alternatively, the characteristics of the device capable of dynamically reconfiguring the circuit are exploited, and construction of an algorithm and reconfiguration of the circuit have achieved the functional implementation within the limit of the finite circuit scale.

SUMMARY

Depending on conditions of components in a system, a location where the processing of the system is bottlenecked is different. Thus, in system design, the amount of data that undergoes processing needs to be reduced to meet conditions of components in a system. In such a case, prioritizing a reduction in the amount of data leads to an increase in the circuit scale of the system. In contrast, prioritizing a reduction in the circuit scale hampers a reduction in the amount of data.

Aspects of non-limiting embodiments of the present disclosure relate to achieving a reduction in the amount of data while an increase in a circuit scale is controlled based on a feature of image data that undergoes processing.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus including a processor that performs image processing and that is constructed by using a reconfigurable-circuit device whose circuit is reconfigurable.

The processor is configured to acquire image data that corresponds to each of one or more small regions into which an image is divided, determine a feature of the image data that is acquired and that corresponds to each of the one or more small regions, select a circuit configuration and perform processing in accordance with the obtained feature of the image data that corresponds to each of the one or more small regions, and cause a repository to retain rendering information, which is the image data that corresponds to each of the one or more small regions and that has undergone the processing.

BRIEF DESCRIPTION OF THE DRAWINGS

An exemplary embodiment of the present disclosure will be described in detail based on the following figures, wherein:

FIG. 5 is a diagram depicting a specific example of a relationship between sequences of contiguous pixels having the same pixel value and processing methods; and FIGS. 6A and 6B are illustrations depicting a configuration example of the preprocessor that is reconfigured, FIG. 6A is an illustration depicting a line determination circuit, and FIG. 6B is an illustration depicting a converter circuit.

DETAILED DESCRIPTION

Hereinafter, an exemplary embodiment of the present disclosure will be described in detail with reference to the attached drawings.

Configuration of Image Processing Apparatus

Figure 1:
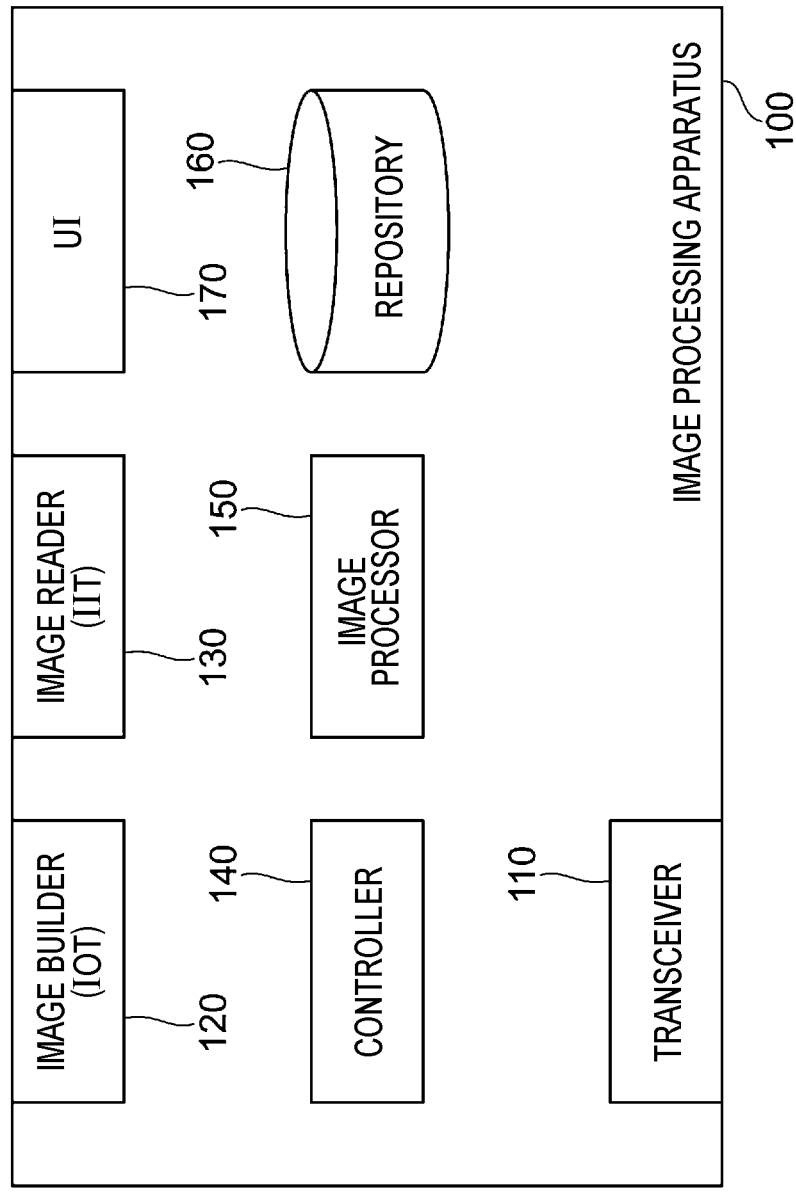
FIG. 1 is an illustration depicting a configuration of an image processing apparatus to which the present exemplary embodiment is applied.

FIG. 1 is an illustration depicting a configuration of an image processing apparatus to which the present exemplary embodiment is applied. An image processing apparatus 100 includes a transceiver 110, an image builder 120, an image reader 130, a controller 140, an image processor 150, a repository 160, and a user interface (UI) 170.

The transceiver 110 is a network interface to connect the image processing apparatus 100 to a network and exchange data. The method for the transceiver 110 to connect to the network is not particularly limited, and the communication line may be wired or wireless.

The image builder 120 is an image output terminal (IOT). The image builder 120, which is constituted by a so-called printer device, uses an image forming material and forms on a sheet of paper, which is an example of a recording medium, images based on image data. Examples of a method for forming images on a recording medium include an electrophotographic system and an inkjet system. In the electrophotographic system, toner attached to a photosensitive member is transferred to a recording medium, and an image is formed. In the inkjet system, ink is discharged on a recording medium, and an image is formed.

The image reader 130 is an image input terminal (IIT). The image reader 130, which is constituted by a so-called scanner device, optically reads an image in a document that is set and generates a read image (image data). Examples of a method for reading images include a charge coupled device (CCD) system and a contact image sensor (CIS) system. The CCD system uses a lens to reduce an optical image formed by light reflected by a document, which is irradiated by a light source, and uses CCDs to receive the reflected light. The CIS system uses a CIS to receive light reflected by a document, which is irradiated sequentially by a light emitting diode (LED) source.

The controller 140 controls operations of the image processing apparatus 100. Specifically, the controller 140 controls such operations as communication with external apparatuses by using the transceiver 110, processing performed by the image builder 120 or the image reader 130, and information presentation to a user and reception of user operations by using the UI 170. The controller 140 includes a central processing unit (CPU), which is a computing unit, and a main storage device, which is a memory. The CPU loads programs into the main storage device and executes the programs. The CPU executes the programs, and thus various kinds of control and processing described above are performed.

The image processor 150 applies image processing, such as color correction and gradation correction, to an image that undergoes the processing performed by the image builder 120 and the image reader 130. When the image builder 120 performs image forming processing, the image processor 150 according to the present exemplary embodiment converts image data that undergoes the image forming processing and that has been subjected to the image processing. Then, the image processor 150 stores the converted image data in a temporary storage unit. At the time that the image data is required, the image processor 150 retrieves the image data from the temporary storage unit, performs rendering processing, and sends the image data to the image builder 120.

The repository 160 stores various kinds of data and programs. Specifically, the repository 160 stores data containing an image or the like that undergoes processing, operation history data of the image builder 120 and the image reader 130, programs for controlling operations of the image processing apparatus 100, and the like. Examples used as the repository 160 include a nonvolatile storage unit, such as a magnetic disk device or a solid state drive (SSD).

The UI 170 includes a display unit and an input unit. The display unit displays screens such as an operation screen and an information presentation screen, and an operator performs an input operation on the input unit. An input operation is performed on the input unit in accordance with an operation screen displayed by the display unit, and various control commands and various kinds of control data are input. For example, a liquid crystal display is used as the display unit, and a hardware keyboard or a touch sensor is used as the input unit. Another example that may also be used as the UI 170 is a touch panel, which is a combination of a liquid crystal display as the display unit and a touch sensor as the input unit.

Configuration of Image Processor 150

In the case where the image processor 150 is constructed by using hardware, a number of features affect the processing capacity of the image processor 150. Examples of such features include data transfer between the controller 140 and the image processor 150, writing and reading data into and from the repository 160, and data transfer to the image builder 120 from a storage unit in which data is spooled after being subjected to image processing. For some of these features, reduction in the circuit scale in hardware design is prioritized over a transfer speed, which is optimized on a best-effort basis. In contrast, the bandwidth for data transfer is emphasized for some of the remaining features. Although reduction in the circuit scale is not disregarded for such features, the speed of data transfer is prioritized. Thus, it is desirable to balance these factors with each other when designing circuits. In the present example, a device whose circuit is reconfigurable (reconfigurable-circuit device) is used to realize the image processor 150, and it is attempted to improve the processing speed within the limit of the finite circuit scale by selecting a circuit configuration in accordance with a processing situation and a feature of an image that undergoes processing. Examples of a reconfigurable-circuit device include a dynamic reconfigurable processor (DRP) and a field-programmable gate array (FPGA).

Figure 2:
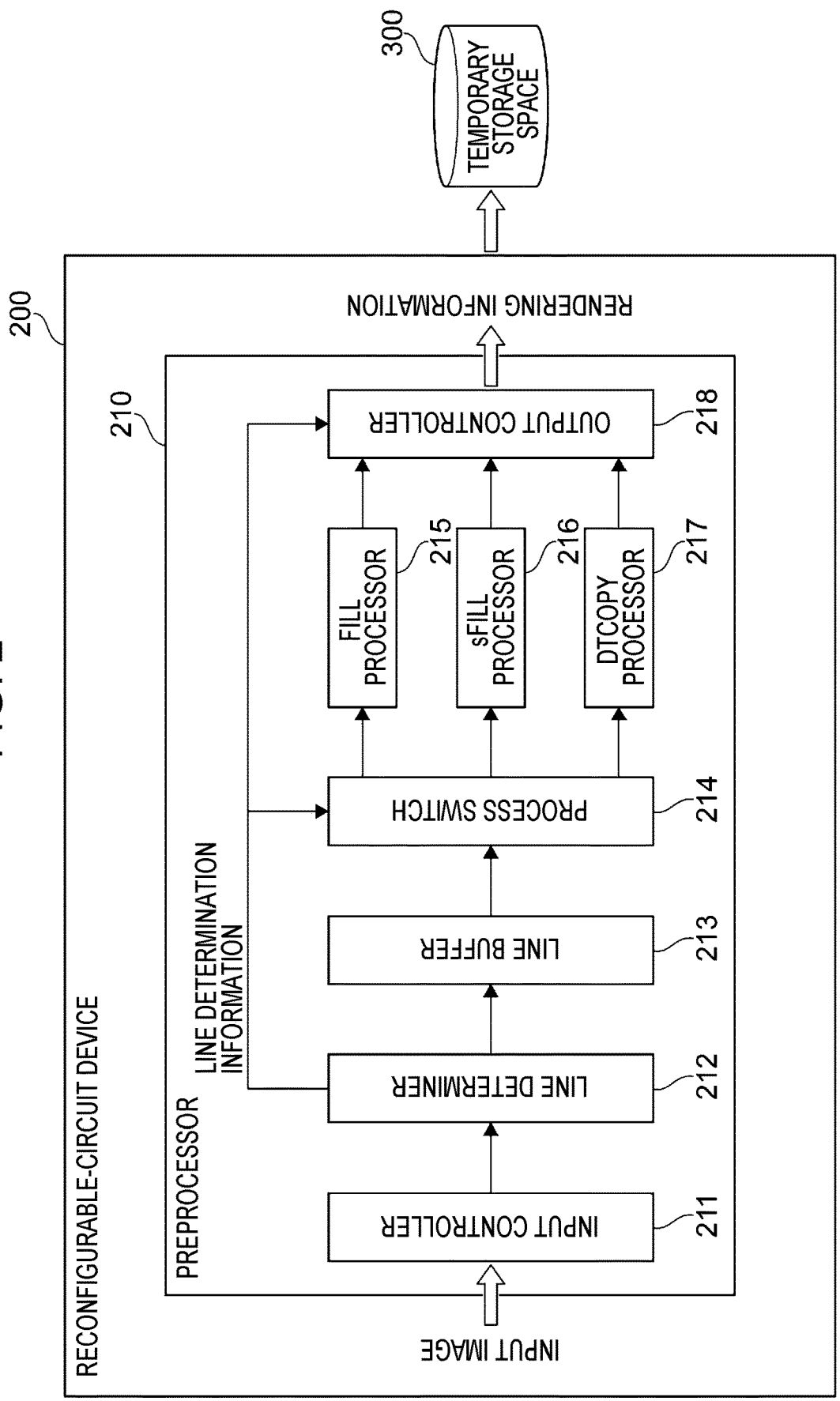
FIG. 2 is an illustration depicting a reconfigurable-circuit device configured as a preprocessor.
Figure 3:
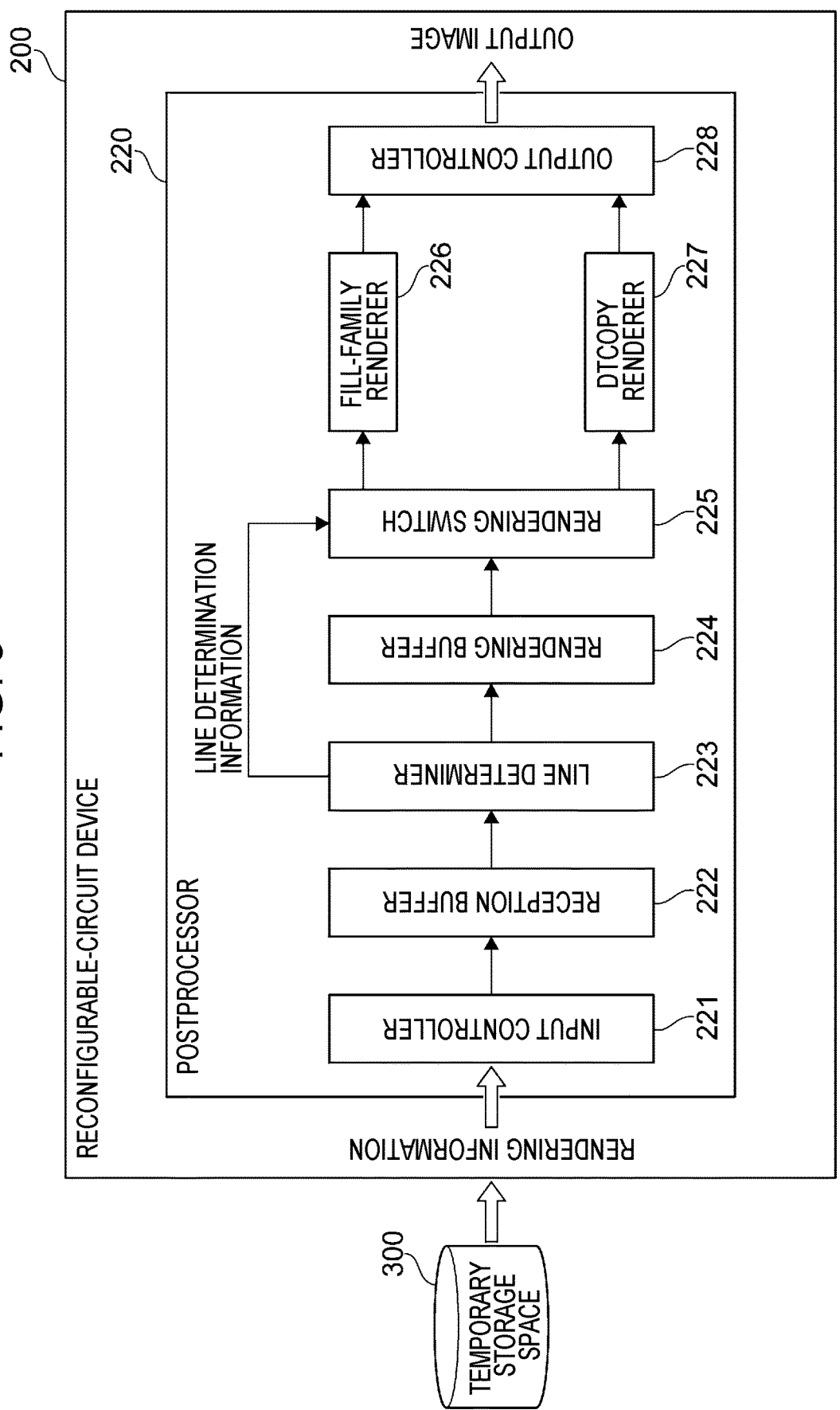
FIG. 3 is an illustration depicting a reconfigurable-circuit device configured as a postprocessor.

FIGS. 2 and 3 are illustrations depicting a configuration of the image processor 150. The image processor 150 is realized by using a reconfigurable-circuit device 200. The reconfigurable-circuit device 200 is reconfigured as a preprocessor 210 or a postprocessor 220, depending on the stage of the processing. FIG. 2 depicts the reconfigurable-circuit device 200 configured as the preprocessor 210, and FIG. 3 depicts the reconfigurable-circuit device 200 configured as the postprocessor 220.

Configuration of Preprocessor 210

As depicted in FIG. 2, the preprocessor 210 includes an input controller 211, a line determiner 212, a line buffer 213, a process switch 214, a FILL processor 215, an sFILL processor 216, a DTCOPY processor 217, and an output controller 218. The preprocessor 210 is connected to a temporary storage space 300. The FILL processor 215, the sFILL processor 216, and the DTCOPY processor 217 are not simultaneously present, and one of the three processors is selectively configured in accordance with the function of the reconfigurable-circuit device 200. Thus, in the following description, when the FILL processor 215, the sFILL processor 216, and the DTCOPY processor 217 are not individually referred to, the term "the processor 215, 216, or 217" will be used.

The input controller 211 acquires from the repository 160 image data that corresponds to each of one or more small regions into which an image that undergoes processing is divided. In this example, a small region corresponds to one of the scanning lines of the image. In other words, an image of a small region corresponds to a pixel sequence of a single line. Thus, the input controller 211 sequentially acquires one line at a time from the image that undergoes processing.

The line determiner 212 determines a feature of image data that corresponds to each line and that is acquired by the input controller 211. The feature of the image data is determined based on the average of the numbers of pixels, each number representing the number of contiguous pixels having the same pixel value in a line. In addition, the line determiner 212 determines the type of conversion processing. The type of conversion processing is determined in accordance with the feature of the image data, the feature being the determination result. The image data undergoes the conversion processing and is thereafter stored in the temporary storage space 300. The type of conversion processing is determined to be one of DTCOPY processing, FILL processing, and sFILL processing. The FILL processing and the sFILL processing belong to FILL-family processing.

The DTCOPY processing is a processing method based on a pixel value of each pixel in one line and generates image data in a DTCOPY format. The FILL-family processing is a processing method based on a pixel value and the number of contiguous pixels having the same pixel value and generates a command of the FILL family. The FILL-family processing is classified into the FILL processing and the sFILL processing, and the FILL processing generates a command in a FILL format having the maximum allowable length of a sequence of contiguous pixels equal to a first length. The sFILL processing generates a command in an sFILL format having the maximum allowable length of a sequence of contiguous pixels equal to a second length, which is shorter than the first length.

If the average of the numbers of pixels, each number representing the number of contiguous pixels having the same pixel value in a line, is equal to or smaller than a first threshold, the line determiner 212 determines that the DTCOPY processing be performed as the conversion processing of image data. If the average of the numbers of pixels, each number representing the number of contiguous pixels having the same pixel value in a line, is greater than the first threshold and equal to or smaller than a second threshold, which is set to a greater value than the first threshold, the line determiner 212 determines that the sFILL processing be performed as the conversion processing of image data. If the average of the numbers of pixels, each number representing the number of contiguous pixels having the same pixel value in a line, is greater than the second threshold, the line determiner 212 determines that the FILL processing be performed as the conversion processing of image data.

The line buffer 213 retains image data corresponding to each line acquired by the input controller 211. The line buffer 213 may also retain in association with the image data a determination result obtained by the line determiner 212 and a determination result regarding the processing to be performed.

For each line, the process switch 214 selects the circuit configuration of the processor 215, 216, or 217 in accordance with the determination result obtained by the processing performed by the line determiner 212, and the circuit is reconfigured as one of the FILL processor 215, the sFILL processor 216, and the DTCOPY processor 217. Then, the process switch 214 reads the image data from the line buffer 213 and causes one of the FILL processor 215, the sFILL processor 216, and the DTCOPY processor 217, which has been reconfigured, to perform the processing. Since the process switch 214 reconfigures the processor 215, 216, or 217 for each line, the processing method does not change during the processing applied to a single line. Specifically, while image data corresponding to a single line is being processed, the processor 215, 216, or 217 operates as one of the FILL processor 215, the sFILL processor 216, and the DTCOPY processor 217, and a plurality of processors 215, 216, and 217 of different types do not coexist.

The FILL processor 215 is configured in accordance with the switching control performed by the process switch 214. The FILL processor 215 performs the FILL processing and generates one or more commands in the FILL format, and the one or more commands represent an image corresponding to a single line. Information regarding the number of contiguous pixels having the same pixel value is described in a command in the FILL format. Namely, a command in the FILL format represents an image in a so-called RUN format. Thus, a command in which information regarding a pixel value and information regarding the number of contiguous pixels are included is individually provided every time the pixel value changes in a line. In addition, information indicating the type of command is recorded in each command in the FILL format.

The sFILL processor 216 is configured in accordance with the switching control performed by the process switch 214. The sFILL processor 216 performs the sFILL processing and generates one or more commands in the sFILL format, and the one or more commands represent an image corresponding to a single line. A command in the sFILL format is similar to a command in the FILL format, but the information indicating the type of command is omitted. The information indicating the type of command is recorded for each line separately from each command. In addition, an upper limit for the number of contiguous pixels in an image represented by a single command is set to a smaller value for a command in the sFILL format than for a command in the FILL format.

The DTCOPY processor 217 is configured in accordance with the switching control performed by the process switch 214. The DTCOPY processor 217 performs the DTCOPY processing and generates image data in the DTCOPY format, in which a combination of a pixel value and tag information is described for each pixel. Image data in the DTCOPY format is represented in a so-called raw format. Attribute information of an object represented by an image is described in the tag information included in the image data in the DTCOPY format. The attribute information indicates the type of image (such as graphics or text) represented by the pixel.

The processing performed by the processor 215, 216, or 217 generates one or more FILL-family commands or image data in the DTCOPY format for each line. The output controller 218 outputs the one or more FILL-family commands or the image data in the DTCOPY format and stores the commands or the image data in the temporary storage space 300. The temporary storage space 300 is a so-called spooling medium and is realized by using, for example, the repository 160. In the following description, the FILL-family commands and the image data in the DTCOPY format are collectively referred to as rendering information.

Configuration of Postprocessor 220

As depicted in FIG. 3, the postprocessor 220 includes an input controller 221, a reception buffer 222, a line determiner 223, a rendering buffer 224, a rendering switch 225, a FILL-family renderer 226, a DTCOPY renderer 227, and an output controller 228. The postprocessor 220 is connected to the temporary storage space 300. Based on the function of the reconfigurable-circuit device 200, the postprocessor 220 replaces the preprocessor 210 through the reconfiguration of the circuit. One of the FILL-family renderer 226 and the DTCOPY renderer 227 is selectively configured based on the function of the reconfigurable-circuit device 200. Thus, in the following description, when the FILL-family renderer 226 and the DTCOPY renderer 227 are not individually referred to, the term "the renderer 226 or 227" will be used.

The input controller 221 acquires rendering information corresponding to a single line from the temporary storage space 300 at a time. The reception buffer 222 retains the rendering information corresponding to a single line acquired by the input controller 221.

The line determiner 223 reads the rendering information corresponding to a single line from the reception buffer 222 at a time and determines for the rendering information that is read the type of the processing performed by the preprocessor 210 (whether the rendering information is one or more FILL-family commands or image data in the DTCOPY format). The rendering buffer 224 retains the rendering information for which the line determiner 223 has determined the type of the processing.

The rendering switch 225 selects the circuit configuration of the renderer 226 or 227 in accordance with the determination result obtained by the line determiner 223, and the circuit is reconfigured as one of the FILL-family renderer 226 and the DTCOPY renderer 227. Then, the rendering switch 225 reads the rendering information from the rendering buffer 224 and causes one of the FILL-family renderer 226 and the DTCOPY renderer 227, which has been reconfigured, to perform the processing. Since the rendering switch 225 reconfigures the renderer 226 or 227 for each line, the processing method does not change during the processing applied to a single line. Specifically, while the rendering information corresponding to a single line is being processed, the renderer 226 or 227 operates as one of the FILL-family renderer 226 and the DTCOPY renderer 227, and the FILL-family renderer 226 and the DTCOPY renderer 227 do not coexist.

The FILL-family renderer 226 renders an image corresponding to a single line in accordance with one or more FILL-family commands (commands in the FILL format or in the sFILL format). The DTCOPY renderer 227 renders an image corresponding to a single line in accordance with image data in the DTCOPY format.

The output controller 228 outputs to the image builder 120 an image rendered by the FILL-family renderer 226 or the DTCOPY renderer 227. The image builder 120 forms the obtained image on a medium such as a sheet.

Operation of Preprocessor 210

Figure 4:
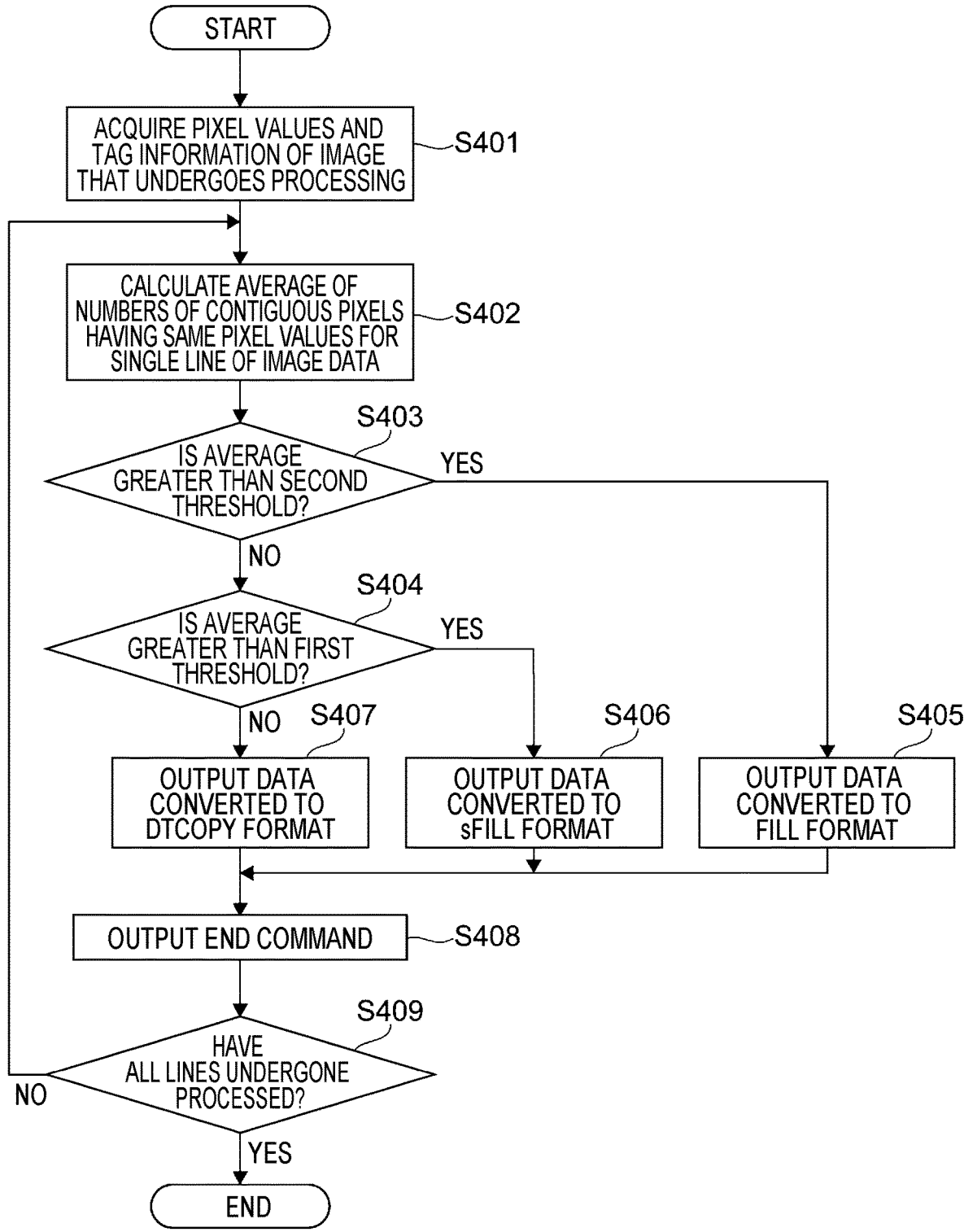
FIG. 4 is a flowchart depicting an operation of the preprocessor.

FIG. 4 is a flowchart depicting an operation of the preprocessor 210. If the input controller 211 in the preprocessor 210 acquires pixel values and tag information of an image that undergoes the processing (S401), the line determiner 212 calculates the average of the numbers of pixels, each number representing the number of contiguous pixels having the same pixel value, for acquired image data corresponding to a single line (S402).

If the value calculated in S402 is greater than the second threshold described above (YES in S403), the line determiner 212 determines to apply the FILL processing to the image data. In response to this determination, the process switch 214 configures the FILL processor 215, applies the processing to the image data, and generates one or more commands in the FILL format (referred to as data converted to the FILL format in FIG. 4) as rendering information. The generated rendering information is output via the output controller 218 (S405) and retained in the temporary storage space 300.

If the value calculated in S402 is equal to or smaller than the second threshold described above and greater than the first threshold (NO in S403 and YES in S404), the line determiner 212 determines to apply the sFILL processing to the image data. In response to this determination, the process switch 214 configures the sFILL processor 216, applies the processing to the image data, and generates one or more commands in the sFILL format (referred to as data converted to the sFILL format in FIG. 4) as rendering information. The generated rendering information is output via the output controller 218 (S406) and retained in the temporary storage space 300.

If the value calculated in S402 is equal to or smaller than the first threshold described above (NO in S403 and NO in S404), the line determiner 212 determines to apply the DTCOPY processing to the image data. In response to this determination, the process switch 214 configures the DTCOPY processor 217, applies the processing to the image data, and generates image data in the DTCOPY format (referred to as data converted to the DTCOPY format in FIG. 4) as rendering information. The generated rendering information is output via the output controller 218 (S407) and retained in the temporary storage space 300.

If the rendering information is generated in S405, S406, or S407, the output controller 218 attaches an END command that indicates the end of the line to the generated rendering information, outputs the END command (S408), and causes the temporary storage space 300 to retain the END command. Thereafter, it is determined whether the processing has been applied to all the lines in the image that undergoes the processing, and if at least one line that has not undergone the processing (NO in S409), the processing from S402 to S408 is applied to image data corresponding to a next line. If all the lines have undergone the processing (YES in S409), the processing ends.

Comparison Between Pieces of Rendering Information

More detail will be provided regarding a command in the FILL format, a command in the sFILL format, and image data in the DTCOPY format. First, the difference between a FILL-family command and image data in the DTCOPY format will be described. A FILL-family command, which is a fixed-sized command, describes a collection of a plurality of contiguous pixels having the same pixel value. A new command is provided to describe one or more pixels having a new pixel value every time the pixel value changes. In contrast, a combination of a pixel value and tag information is used to describe each pixel in image data in the DTCOPY format. Thus, if the pixel value does not change frequently, the amount of data representing an image corresponding to a single line is smaller for a FILL-family command, which can represent information regarding a number of pixels by using a single command. In contrast, if the pixel value changes frequently, the amount of data representing an image corresponding to a single line is smaller for data in the DTCOPY format because the number of commands increases with the frequency of change for the FILL-family command.

Next, the difference between a command in the FILL format and a command in the sFILL format, which are both FILL-family commands, will be described. For a command in the FILL format, the maximum number of contiguous pixels having the same pixel value is equal to a second length. The second length typically has a size great enough to include all the pixels in a line. Thus, if all the pixels in a line have the same pixel value, a single command can describe the line. A single command includes pixel information in which a pixel value and tag information are included and information indicating the type of command (information indicating that the command is in the FILL format). In the FILL format, every time the pixel value changes, a new command that includes the information indicating the type of command describes one or more pixels having a new pixel value.

In contrast, for a command in the sFILL format, the maximum number of contiguous pixels having the same pixel value is equal to a first length, which is shorter than the second length. The first length is typically smaller than the number of all the pixels in a line. Thus, a plurality of pieces of sFILL data are typically recorded for a line. Further, in the sFILL format, a piece of information indicating the type of command is recorded for a line, and each command only describes pixel information in which a pixel value and tag information are included.

Thus, the size of a command is smaller than the size of a command in the FILL format. Consequently, if the pixel value does not change frequently, the amount of data representing an image corresponding to a single line is smaller in the FILL format because a smaller number of commands in the FILL format can describe the image corresponding to a single line. In contrast, if the pixel value changes frequently, the number of commands increases with the frequency of change both for the FILL format and for the sFILL format. However, the amount of data representing an image corresponding to a single line is greater in the FILL format because each command in the FILL format includes the information indicating the type of command and the size of a command in the FILL format is greater.

FIG. 5 is a diagram depicting a specific example of a relationship between sequences of contiguous pixels having the same pixel value and processing methods. In the example depicted in FIG. 5, the average RUN length represents the average of the numbers of pixels, each number representing the number of contiguous pixels having the same pixel value in a line. In FIG. 5, the average RUN lengths are represented by powers of two. A parameter "FILL number" represents the number of commands in the FILL format required for recording an image corresponding to a single line as a function of the average RUN length. A parameter "sFILL number" represents the number of commands in the sFILL format required for recording an image corresponding to a single line as a function of the average RUN length. A parameter "FILL processing" represents the amount of data required to describe a single line by using one or more commands in the FILL format as a function of the average RUN length. A parameter "sFILL processing" represents the amount of data required to describe a single line by using one or more commands in the sFILL format as a function of the average RUN length. A parameter "DTCOPY processing" represents the amount of data required to describe a single line by using the DTCOPY format.

In the example depicted in FIG. 5, the number of pixels in a line is assumed to be 14080, and the pixel information of a pixel is assumed to be represented by using 12 bits. A command in the FILL format is assumed to have a size of 4 bytes (32 bits), and the information regarding the number of contiguous pixels having the same pixel value is represented by using 20 bits (=32 bits−12 bits). A command in the sFILL format is assumed to have a size of 2 bytes (16 bits), and the information regarding the number of contiguous pixels having the same pixel value is represented by using 4 bits (=16 bits−12 bits). A piece of image data in the DTCOPY format represents the pixel information by using 12 bits for each pixel.

In this example, if the average RUN length is 1, the FILL number and the sFILL number are 14080. If the average RUN length is 14080, the FILL number is 1. Since a command in the sFILL format can represent up to 15 contiguous pixels (4 bits) having the same pixel value, the sFILL number is more than one even if the average RUN length is 14080. Referring to FIG. 5, if the average RUN length is 1, image data in the DTCOPY format has the minimum amount of data. If the average RUN length is 2 to 8, commands in the sFILL format have the minimum amount of data. If the average RUN length is 16 or greater, commands in the FILL format have the minimum amount of data. Thus, the line determiner 212 determines in S403 and S404 depicted in FIG. 4 which of the FILL processor 215, the sFILL processor 216, and the DTCOPY processor 217 is used in accordance with the average RUN length described above.

Other Configuration Examples

In the configuration example depicted in FIG. 2, after the line determiner 212 determines which of the processors 215, 216, and 217 is selected, image data corresponding to each line is retained in the line buffer 213 once, and then the process switch 214 reconfigures the circuit to provide one of the processors 215, 216, and 217. It is possible to reconfigure not only the processor 215, 216, or 217 but also the preprocessor 210 entirely. Specifically, for image data that corresponds to a line and that undergoes the processing, first, it is determined which of the processors 215, 216, and 217 is selected. Then, the preprocessor 210 is reconfigured, and the processing is performed by one of the FILL processor 215, the sFILL processor 216, and the DTCOPY processor 217.

FIGS. 6A and 6B are illustrations depicting a configuration example of the preprocessor 210, which is reconfigured. FIG. 6A is an illustration depicting a line determination circuit, and FIG. 6B is an illustration depicting a converter circuit. A line determination circuit 230 depicted in FIG. 6A includes the input controller 211 and the line determiner 212. A converter circuit 240 depicted in FIG. 6B includes the process switch 214, the FILL processor 215, the sFILL processor 216, the DTCOPY processor 217, and the output controller 218. Since the function of each functional component in the line determination circuit 230 and the converter circuit 240 is the same as the function of the corresponding functional component in the preprocessor 210, which is depicted in FIG. 2, each component is denoted by the same symbol, and the description is omitted. Similarly to the case of the preprocessor 210, which is depicted in FIG. 2, the FILL processor 215, the sFILL processor 216, and the DTCOPY processor 217 are not simultaneously present, and one of the three processors is selectively configured under the control of the process switch 214 in accordance with the function of the reconfigurable-circuit device 200. In other words, the line determination circuit 230, which is depicted in FIG. 6A, and the converter circuit 240, which is depicted in FIG. 6B, are formed as separate circuits and correspond to a first section and a second section, respectively, of the preprocessor 210, which is depicted in FIG. 2. The first section performs a portion of the processing performed by the preprocessor 210 up to the one performed by the line determiner 212, and the second section converts image data to one or more FILL-family commands or data in the DTCOPY format.

In the line determination circuit 230, which is depicted in FIG. 6A, the determination result obtained by the processing performed by the line determiner 212 is temporarily retained in an external memory. Subsequently, after the circuit is reconfigured from the line determination circuit 230 to the converter circuit 240, which is depicted in FIG. 6B, the process switch 214 acquires the determination result obtained by the line determiner 212 from the external memory, and one of the FILL processor 215, the sFILL processor 216, and the DTCOPY processor 217 is reconfigured to perform the conversion processing. In this example, the image data that undergoes the processing may be acquired again when the converter circuit 240 performs the processing, separately from the acquisition by the line determination circuit 230. Consequently, the line buffer 213, which is included in the preprocessor 210 depicted in FIG. 2 and retains image data corresponding to a single line after the determination by the line determiner 212, does not need to be installed.

Further, in the exemplary embodiment described above, the type of processing performed by the processor 215, 216, or 217 is determined based on the feature of the image data corresponding to a line (small region). The type of processing performed by the processor 215, 216, or 217 may be determined based on the circuit scale of the reconfigurable-circuit device 200 in addition to the feature of the image data. Although the circuit configuration of the reconfigurable-circuit device 200 can be changed, factors, such as the memory capacity of the internal memory and the number of computing units, that determine the circuit scale cannot be changed. Namely, once the type of the reconfigurable-circuit device 200 used as the image processor 150 is determined, the circuit scale is fixed. As described above, the data transfer from the storage unit (temporary storage space 300) to the image builder 120 is one of the features that affect the processing capacity of the image processor 150. In this data transfer, data subjected to image processing is spooled in and read from the storage unit (temporary storage space 300) and sent to the image builder 120. The bandwidth of data transfer is valued in this feature. The rendering information is read from the temporary storage space 300, processed, and transferred to the image builder 120 by the postprocessor 220. Thus, the postprocessor 220 may be configured to increase the data transfer speed within the limit of the circuit scale of the reconfigurable-circuit device 200.

If the available capacity of the internal memory is limited, one of the FILL-family processing and the DTCOPY processing is selected in the preprocessor 210 so as to minimize the amount of data included in the rendering information, as described in the exemplary embodiment above. In this way, the capacity of the reception buffer 222, which is needed for the postprocessor 220, is reduced, and the capacity limit to the internal memory can be handled. In contrast, if the number of available computing units is small, it is necessary to reduce the number of computing units that constitute the postprocessor 220 while the increase in the amount of data included in the rendering information is tolerated.

As an example, if the number of available computing units is small, the postprocessor 220 may be configured so as to perform one of the processing to render an image by using the FILL-family commands and the processing to render an image by using image data in the DTCOPY format. For example, if it is determined that only the FILL-family processing and not the DTCOPY processing be performed in the preprocessor 210, it is possible for the postprocessor 220 to receive only the FILL-family commands and not image data in the DTCOPY format. In this way, the postprocessor 220 only performs the processing to render an image by using the FILL-family commands, and thus it is unnecessary to install the line determiner 223, the rendering switch 225, the DTCOPY renderer 227, and the like. This leads to elimination of computing units allocated to these functions. The setting of the first threshold is changed so that the DTCOPY processing is not selected in the determination by the line determiner 212, and thus the preprocessor 210 is allowed to perform only the FILL-family processing and not the DTCOPY processing. The second threshold may also be changed in accordance with the setting change in the first threshold.

Rendering an image by using image data in the DTCOPY format tends to require a larger memory capacity to perform the processing than rendering an image by using the FILL-family commands. Thus, if the capacity of the internal memory available to the circuit configured as the postprocessor 220 is sufficient, the process efficiency is higher when the amount of image data in the DTCOPY format is large.

If the available capacity of the internal memory is limited, the process efficiency is higher when the number of the FILL-family commands is large. Thus, if the available capacity of the internal memory is sufficient, the first threshold, which is used in the determination by the line determiner 212 in the preprocessor 210, may be set to a small value so that the postprocessor 220 more frequently uses image data in the DTCOPY format to perform the processing of rendering an image. In contrast, if the available capacity of the internal memory is limited, the first threshold may be set to a large value so that the postprocessor 220 more frequently uses the FILL-family commands to perform the processing of rendering an image. In these cases, the second threshold may also be changed in accordance with the setting change in the first threshold.

In contrast, rendering an image by using the FILL-family commands tends to require a larger number of computing units to perform the processing than rendering an image by using image data in the DTCOPY format. Thus, if the number of computing units available to the circuit configured as the postprocessor 220 is large, the process efficiency is higher when the number of the FILL-family commands is large. If the number of available computing units is small, the process efficiency is higher when the amount of image data in the DTCOPY format is large. Thus, if the number of available computing units is large, the first threshold, which is used in the determination by the line determiner 212 in the preprocessor 210, may be set to a large value so that the postprocessor 220 more frequently uses the FILL-family commands to perform the processing of rendering an image. If the number of available computing units is small, the first threshold may be set to a small value so that the postprocessor 220 more frequently uses image data in the DTCOPY format to perform the processing of rendering an image. In these cases, the second threshold may also be changed in accordance with the setting change in the first threshold.

The exemplary embodiment of the present disclosure has been described as above, but the technical scope of the present disclosure is not limited to the exemplary embodiment described above. Various modifications and alternatives to the configuration that do not depart from the technical scope of the present disclosure are included in the present disclosure. For example, in the operation example described with reference to FIG. 4, the processing to be applied to the image data is selected based on the result of comparisons of the average of the numbers of pixels with the first threshold and the second threshold, each number representing the number of contiguous pixels having the same pixel value in a single line of the image data. In contrast, instead of directly using the number of contiguous pixels having the same pixel value for selection, the number of commands required to apply the FILL processing to image data corresponding to a single line (FILL number) and the number of commands required to apply the sFILL processing to image data corresponding to a single line (sFILL number) may be used to select processing.

Specifically, as described above, if it is determined by the line determiner 212 that the average of the numbers of pixels, each number representing the number of contiguous pixels having the same pixel value in a line, is greater than the second threshold, the FILL processing is applied to image data as conversion processing. If it is determined that the average of the numbers of pixels, each number representing the number of contiguous pixels having the same pixel value in a line, is greater than the first threshold and equal to or smaller than the second threshold, which is set to a greater value than the first threshold, the sFILL processing is applied to image data as conversion processing. Thus, a FILL number and an sFILL number are determined based on the number of contiguous pixels having the same pixel value in a line, and a FILL number and an sFILL number may be used instead of the number of contiguous pixels having the same pixel value for the determination by the line determiner 212. If a FILL number and an sFILL number are used instead of the number of contiguous pixels having the same pixel value, thresholds individually set for a FILL number and an sFILL number are used as the determination condition instead of the first threshold and the second threshold.

A threshold set for a FILL number is referred to as a FILL-number threshold, and a threshold set for an sFILL number is referred to as an sFILL-number threshold. The line determiner 212 compares a FILL number and an sFILL number obtained from a line that undergoes the processing with the FILL-number threshold and the sFILL-number threshold, respectively, and selects the processing to be applied to the image data corresponding to the line in accordance with the comparison result. In a specific relationship of a FILL number and an sFILL number to the first threshold and the second threshold, if the average of the numbers of pixels, each number representing the number of contiguous pixels having the same pixel value in a line, is smaller than the first threshold, a FILL number is larger than the FILL-number threshold and an sFILL number is larger than the sFILL-number threshold. If the average of the numbers of pixels, each number representing the number of contiguous pixels having the same pixel value in a line, is greater than the first threshold and smaller than the second threshold, a FILL number is larger than the FILL-number threshold and an sFILL number is equal to or smaller than the sFILL-number threshold. If the average of the numbers of pixels, each number representing the number of contiguous pixels having the same pixel value in a line, is greater than the second threshold, a FILL number is equal to or smaller than the FILL-number threshold and an sFILL number is equal to or smaller than the sFILL-number threshold.

Then, the determination in S403 and S404 in FIG. 4 is made based on a comparison between a FILL number and the FILL-number threshold and a comparison between an sFILL number and the sFILL-number threshold instead of comparisons of the average of the numbers of pixels with the first threshold and the second threshold, each number representing the number of contiguous pixels having the same pixel value. Specifically, if a FILL number is equal to or smaller than the FILL-number threshold, the line determiner 212 determines to perform the FILL processing. If a FILL number is larger than the FILL-number threshold and an sFILL number is equal to or smaller than the sFILL-number threshold, the line determiner 212 determines to perform the sFILL processing. If a FILL number is larger than the FILL-number threshold and an sFILL number is larger than the sFILL-number threshold, the line determiner 212 determines to perform the DTCOPY processing.

In the embodiment above, the term "processor" refers to hardware in a broad sense. Examples of the processor include general processors (e.g., CPU), dedicated processors (e.g., GPU: Graphics Processing Unit, ASIC: Application Specific Integrated Circuit, FPGA, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
   a processor that performs image processing and that is constructed by using a reconfigurable-circuit device whose circuit is reconfigurable,
   the processor being configured to
      acquire image data that corresponds to each of one or more small regions into which an image is divided,
      determine a feature of the image data that is acquired and that corresponds to each of the one or more small regions,
      select a circuit configuration and perform processing in accordance with the determined feature of the image data that corresponds to each of the one or more small regions, wherein
         when the determined feature of the image data corresponding to a respective small region indicates that an average number of contiguous pixels having a same pixel value is greater than a first threshold, the circuit configuration is selected so as to convert the image data corresponding to the respective small region into a first format where a fixed-sized command describes a collection of the contiguous pixels having the same pixel value, and
         when the determined feature of the image data corresponding to the respective small region indicates that the average number of contiguous pixels having the same pixel value is not greater than the first threshold, the circuit configuration is selected so as to convert the image data corresponding to the respective small region into a second format different from the first format where a combination of a pixel value and tag information is used to describe each pixel in the image data, and
      cause a repository to retain rendering information, which is the image data that corresponds to each of the one or more small regions and that has undergone the processing.

2. The image processing apparatus according to claim 1, wherein each of the one or more small regions is a pixel sequence corresponding to a scanning line of the image.

3. The image processing apparatus according to claim 2, wherein the feature of the image data that corresponds to each of the one or more small regions is determined based on an average of numbers of pixels, each number representing a number of contiguous pixels having a same pixel value in the pixel sequence corresponding to the scanning line.

4. The image processing apparatus according to claim 3, wherein in accordance with the determination, if the average of numbers of pixels, each number representing the number of contiguous pixels having the same pixel value in one of the one or more small regions, is greater than the first threshold, at least one command representing the image data by using a pixel value and the number of contiguous pixels having the same pixel value is generated, and if the average of numbers of pixels, each number representing the number of contiguous pixels having the same pixel value, is equal to or smaller than the first threshold, image processing is performed by using a processing method based on a pixel value of each pixel forming the small region.

5. The image processing apparatus according to claim 4, wherein if the average of numbers of pixels, each number representing the number of contiguous pixels having the same pixel value in one of the one or more small regions, is greater than a second threshold that is greater than the first threshold, image processing is performed by using a first processing method in which a length of a sequence of contiguous pixels is not allowed to exceed a first length and if the average of numbers of pixels, each number representing the number of contiguous pixels having the same pixel value, is greater than the first threshold and equal to or smaller than the second threshold, image processing is performed by using a second processing method in which a length of a sequence of contiguous pixels is not allowed to exceed a second length that is smaller than the first length.

6. The image processing apparatus according to claim 1, wherein the processor includes as separate circuits a circuit that determines a feature of the image data and a circuit that performs the image processing.

7. The image processing apparatus according to claim 6, wherein the circuit that performs the image processing acquires the image data and performs the image processing separately from the circuit that determines a feature of the image data.

8. The image processing apparatus according to claim 1, wherein the processor is configured to
acquire the rendering information from the repository,
determine a type of image processing applied to the rendering information for each of the one or more small regions,
select a circuit configuration and perform rendering processing in accordance with the type of image processing that is determined, and
transmit an image obtained by the rendering processing to an image output apparatus.

9. The image processing apparatus according to claim 8, wherein the processor is configured to
select a circuit configuration to perform the image processing in accordance with, in addition to the feature of the image data that corresponds to each of the one or more small regions, a capacity of an internal memory in a circuit used to perform processing that follows processing of acquiring the rendering information from the repository.

10. The image processing apparatus according to claim 8, wherein the processor is configured to
select a circuit configuration to perform the image processing in accordance with, in addition to the feature of the image data that corresponds to each of the one or more small regions, a number of computing units in a circuit used to perform processing that follows processing of acquiring the rendering information from the repository.

11. An image processing apparatus comprising:
means for acquiring image data that corresponds to each of one or more small regions into which an image is divided,
means for determining a feature of the image data that is acquired and that corresponds to each of the one or more small regions,
means for selecting a circuit configuration and performing processing in accordance with the determined feature of the image data that corresponds to each of the one or more small regions, wherein
when the determined feature of the image data corresponding to a respective small region indicates that an average number of contiguous pixels having a same pixel value is greater than a first threshold, the circuit configuration is selected so as to convert the image data corresponding to the respective small region into a first format where a fixed-sized command describes a collection of the contiguous pixels having the same pixel value, and
when the determined feature of the image data corresponding to the respective small region indicates that the average number of contiguous pixels having the same pixel value is not greater than the first threshold, the circuit configuration is selected so as to convert the image data corresponding to the respective small region into a second format different from the first format where a combination of a pixel value and tag information is used to describe each pixel in the image data, and
means for causing a repository to retain rendering information, which is the image data that corresponds to each of the one or more small regions and that has undergone the processing.

* * * * *